United States Patent [19]

Kim

[11] Patent Number: 5,667,628
[45] Date of Patent: Sep. 16, 1997

[54] APPARATUS FOR FIXING A TRANSFORMER ON A DRUM FOR USE IN A VIDEO CASSETTE RECORDER

[75] Inventor: Eung-Ki Kim, Seoul, Rep. of Korea

[73] Assignee: Daewoo Electronics Co., Ltd., Seoul, Rep. of Korea

[21] Appl. No.: 645,944

[22] Filed: May 14, 1996

[30] Foreign Application Priority Data

May 18, 1995 [KR] Rep. of Korea .................. 95-10503

[51] Int. Cl.⁶ .................................................. B30B 15/00
[52] U.S. Cl. ............................ 156/581; 156/580; 100/258 A
[58] Field of Search ................................ 156/580, 581, 156/583.1, 583.3, 583.4; 100/93 P, 258 R, 258 A

[56] References Cited

U.S. PATENT DOCUMENTS

| | | | |
|---|---|---|---|
| 2,797,179 | 6/1957 | Reynolds et al. | 156/581 X |
| 2,865,425 | 12/1958 | Byers | 156/581 X |
| 3,580,794 | 5/1971 | Mintz | 156/581 |
| 4,564,408 | 1/1986 | Crumbach et al. | 156/212 |

*Primary Examiner*—James Sells
*Attorney, Agent, or Firm*—Anderson Kill & Olick P.C.

[57] ABSTRACT

An apparatus fixedly attaching transformer to a rotary drum is provided with a pressing means. The pressing means includes a holder driven by a driving means; a rod-shaped supporting member, whose one end is attached to the bottom of the holder, and the other end is removably provided with a portion having a larger diameter than that of the supporting member; a cap movably fitting around the circumferential surface of the supporting member at the end proximal to the holder in such a way that its vertical position is allowed to be adjusted; a ring provided with a groove for accommodating a part of the larger diameter portion of the supporting member, wherein the ring is used for applying a uniform pressure to the rotary transformer and fits around the circumferential surface of the supporting member at the end distal to the holder; and a resilient member for providing an elastic force to the ring located between the cap and the ring in such a way that the ring is allowed to apply a uniform pressure on the upper surface of the rotary transformer during the pressing operation thereof, thereby fixedly attaching the rotary transformer to the drum.

8 Claims, 3 Drawing Sheets

1

APPARATUS FOR FIXING A TRANSFORMER ON A DRUM FOR USE IN A VIDEO CASSETTE RECORDER

FIELD OF THE INVENTION

The present invention relates to a head drum assembly for use in a video cassette recorder ("VCR"); and, more particularly, to an apparatus capable of fixedly attaching a rotary transformer to a rotary drum therein.

BACKGROUND OF THE INVENTION

In general, a VCR includes a pair of transformers for transmitting signals read from a tape by a plurality of heads to a signal processing system therein. One of the pair of transformers is attached on a rotary drum and the other thereof is attached on a stationary drum in the VCR. In attaching the transformers to the drums, it is important to fix the transformers parallel to the drums.

As is shown in FIG. 1, a typical head drum assembly for use in a video cassette recorder includes a rotating shaft 1, a rotary drum 2, a stationary drum 4, a lower and an upper bearings 5, 5', a rotary transformer 6 and a stationary transformer 7.

The rotary drum 2 with a protruding annular portion 3 is tightly fixed to an upper portion of the rotating shaft 1 and the stationary drum 4 rotatably supports the rotating shaft 1 through the lower and the upper bearings 5, 5', wherein the upper and the lower bearings 5, 5' connect the upper and the lower parts of the stationary drum 4 to the lower portion of the rotating shaft 1, respectively.

The rotary transformer 6 may be fixedly attached at the protruding annular portion 3 of the rotary drum 2 using a bonding agent (not shown) and a rotary transformer fixing apparatus.

There is shown in FIG. 2 a cross sectional view of a conventional rotary transformer fixing apparatus 60. As shown, the apparatus 60 includes a sliding member 10, a rod 20 for guiding the movement of the sliding member 10, a holder 30, an integral part of the sliding member 10, and a pressing plate 40 attached at the bottom of the holder 30. The rotary drum 2 is placed upside-down on a jig 50 and the rotary transformer 6 is set on a terminal surface 3a of the protruding annular portion 3 thereof, wherein the terminal surface 3a is applied with the bonding agent.

After the rotary transformer 6 is set on the terminal surface 3a of the protruding annular portion 3 of the rotary drum 2, the sliding member 10 operated by a driving means (not shown) is moved vertically along the guide rod 20, resulting in moving the holder 30 vertically upward or downward. When the holder 30 is moved downward, the pressing plate 40, in turn, presses the upper surface of the rotary transformer 6 for a predetermined time, thereby fixedly attaching it to the rotary drum 2.

However, with such a rotary transformer fixing apparatus, it is difficult to properly attach the rotary transformer on the terminal surface of the protruding annular portion of the rotary drum, since the pressing plate may not apply a uniform pressure to the rotary transformer during the pressing operation thereof due to the distance between it and the sliding member. In addition, the rotary transformer may be damaged by the direct contact with the pressing plate.

SUMMARY OF THE INVENTION

It is, therefore, a primary object of the invention to provide to an apparatus capable of fixedly attaching a rotary transformer precisely to a rotary drum.

It is another object of the invention to prevent the rotary transformer from getting damaged while fixedly attaching it to the rotary drum.

In accordance with one aspect of the present invention, there is provided an apparatus for fixedly attaching a transformer with an opening to a terminal surface of a protruding annular portion of a rotary drum, wherein the rotary drum is provided on a jig and its terminal surface is applied with a bonding agent, the apparatus comprising a sliding member, means for driving the sliding member, a rod for guiding the movement of the sliding member and means for pressing the transformer toward the drum, wherein said pressing means includes: a holder, an integral part of the sliding member; a rod-shaped supporting member, whose one end is attached to the bottom of the holder, and the other end is removably provided with a portion having a larger diameter than that of the supporting member; a cap movably fitting around the circumferential surface of the supporting member at the end proximal to the holder in such a way that its vertical position is allowed to be adjusted; a ring provided with a groove for accommodating a part of the larger diameter portion of the supporting member, wherein the ring is used for applying a uniform pressure to the rotary transformer and fits around the circumferential surface of the supporting member at the end distal to the holder; and a resilient member for providing an elastic force to the ring located between the cap and the ring in such a way that the ring is allowed to apply a uniform pressure on the upper surface of the rotary transformer during the pressing operation thereof, thereby fixedly attaching the rotary transformer to the drum.

BRIEF DESCRIPTION OF THE DRAWINGS

The above and other objects and features of the present invention will become apparent from the following description of preferred embodiments, when taken in conjunction with the accompanying drawings, in which.

DETAILED DESCRIPTION OF THE PREFERRED EMBODIMENTS

Figure 1:
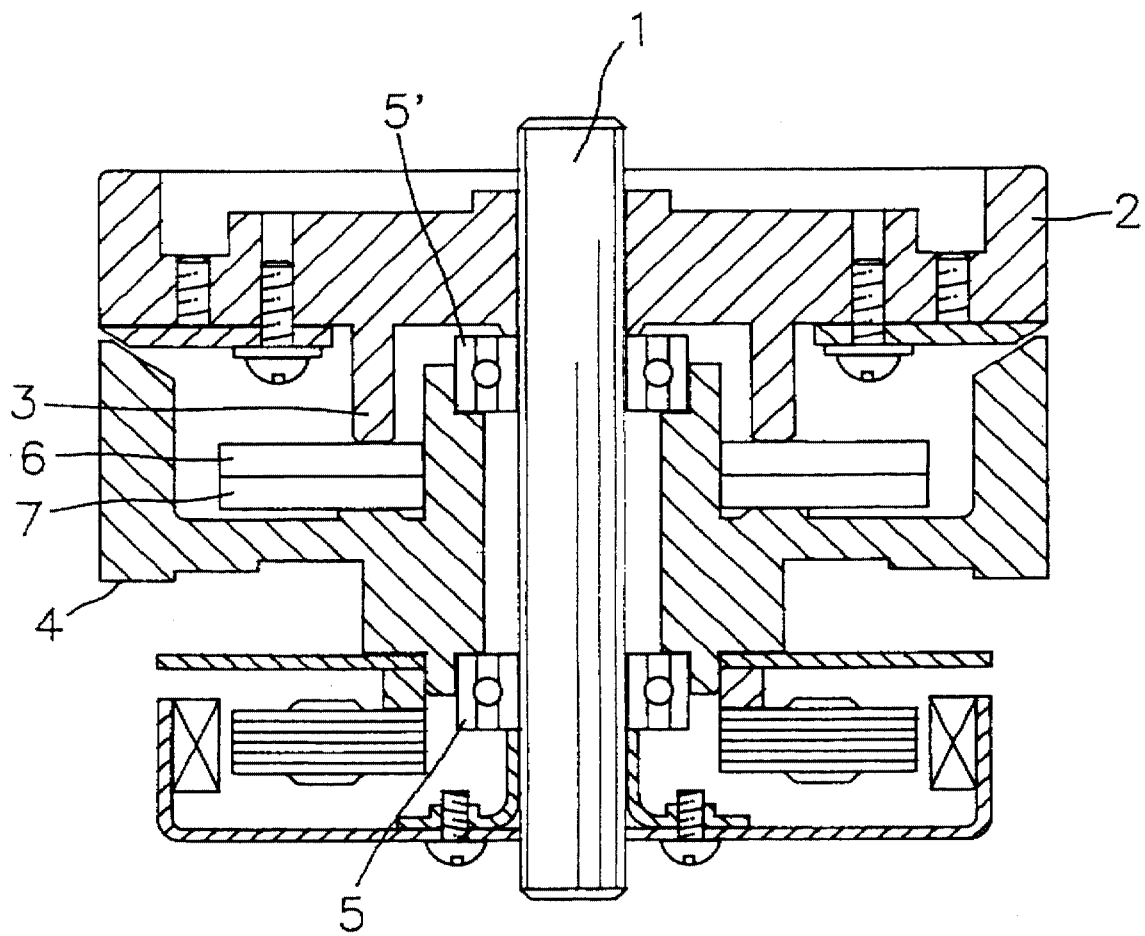
FIGS. 1 shows a cross sectional view of a typical head drum assembly.
Figure 2:
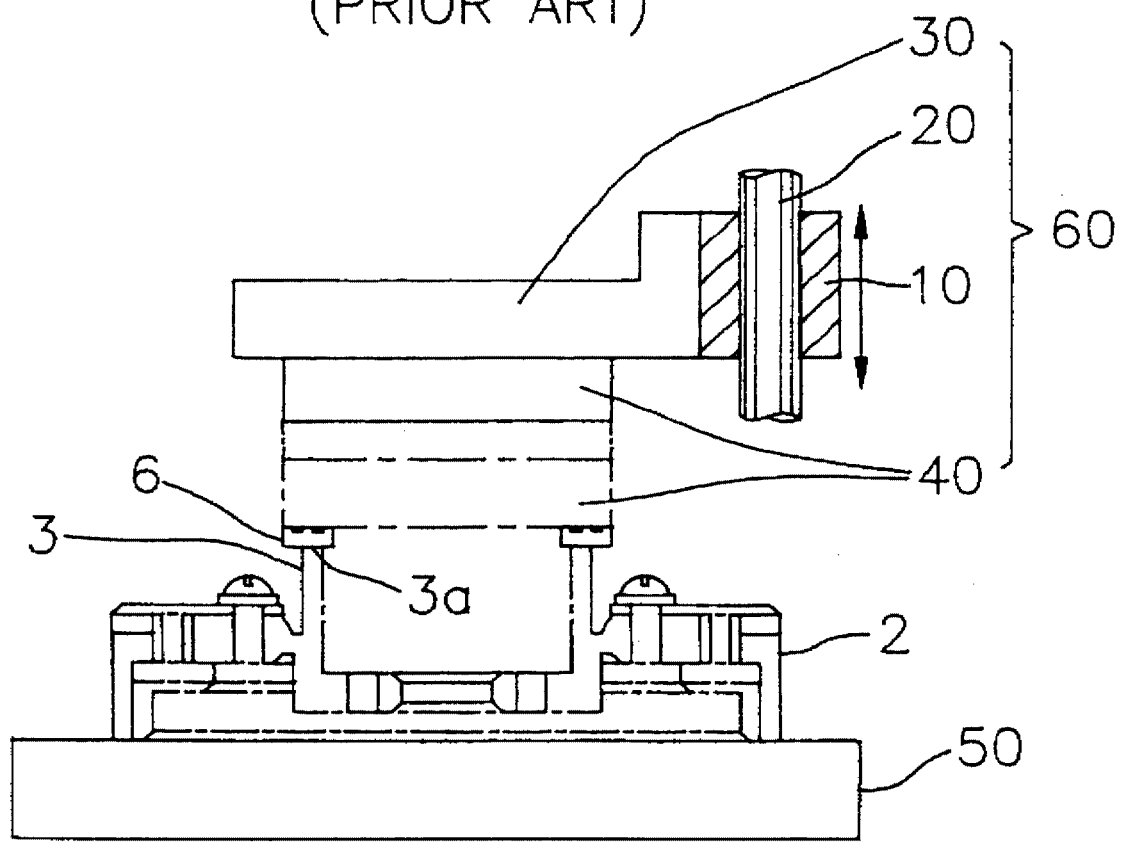
FIGS. 2 illustrates a cross sectional view of a conventional rotary transformer fixing apparatus.
Figure 3:
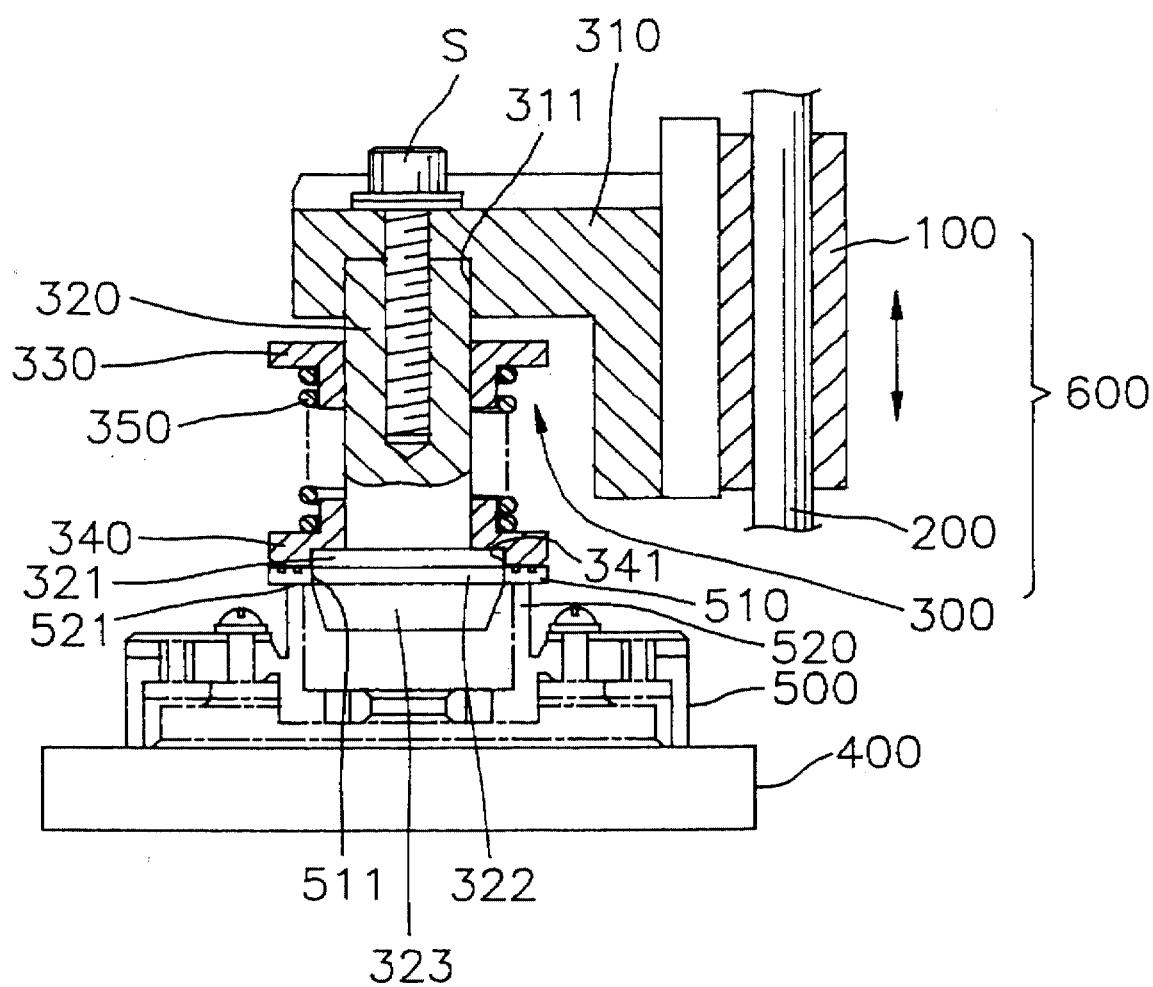
FIG. 3 offers a cross sectional view of the rotary transformer fixing apparatus in accordance with the present invention.

Referring to FIG. 3, there is shown a cross sectional view of an apparatus 600 for fixing a rotary transformer 510 to a rotary drum 500 in a VCR. As shown, the apparatus 600 includes a sliding member 100, a driving means (not shown) for moving the sliding member 100 vertically, a rod 200 for guiding the movement of the sliding member 100 and a pressing device 300. The rotary drum 500 is placed upside-down on a jig 400, and a rotary transformer 510 with an opening 511 is set on a terminal surface 521 of a protruding annular portion 520 of the rotary drum 500, wherein the terminal surface 521 is applied with a bonding agent (not shown).

The pressing device 300 has a holder 310, an integral part of the sliding member 100, and provided with a recess 311 at its bottom, a rod-shaped supporting member 320, a cap 330, a ring 340 and a coil spring 350.

One end of the rod-shaped supporting member 320 proximal to the holder 310 tightly fits into the recess 311 to be secured by a fixing screw (S), and other end thereof distal from the holder 310 is provided with a flange 321 having a larger diameter than that of the supporting member 320, a snug portion 322 fitting closely and comfortably into the opening 511 of the rotary transformer 510 and a tapered extreme portion 323 for guiding the snug portion 322 into the opening 511 of the rotary transformer 510.

The cap 330 movably fits around a circumferential surface of the proximal end of the supporting member 320 in such a way that its vertical position is allowed to be adjusted by a cap fixing member, e.g., a screw.

The ring 340 for applying a uniform pressure on the rotary transformer 510 fits around a circumferential surface of the distal end of the supporting member 320 and is provided with a groove 341 for accommodating the flange 321 which prevents the ring 340 from deviating from the supporting member 320. It is preferable for the surface of the ring 340 coming into contact with the upper surface of the rotary transformer 510 to be made of a soft material, e.g., a rubber to prevent the transformer from getting damaged while fixedly attaching it to the rotary drum 500.

The coil spring 350 for providing an elastic force to the ring 340 surrounds the portion of the supporting member 320 between the cap 330 and the ring 340.

After the rotary transformer 510 is set on the terminal surface 521 of the protruding annular portion 520 of the rotary drum 500, the sliding member 100 is moved vertically along the guide rod 200, resulting in moving the holder 310 and the supporting member 320 vertically upward or downward. When the supporting member 320 is moved downward, the coil spring 350 applies an elastic force to the ring 340, which, in turn, uniformly presses the upper surface of the rotary transformer 510, thereby fixedly attaching the rotary transformer 510 to the drum 500. The strength of the elastic force applied to the rotary transformer 510 is adjusted by changing the vertical position of the cap 330.

With such a rotary transformer fixing apparatus, since the uniform pressure is applied to the transformer, it is possible to fixedly attach the transformer precisely parallel to the terminal surface of the drum. In addition, since the contact surface of the ring with the rotary transformer is made of a soft material, it is possible to prevent the transformer from getting damaged while fixedly attaching it to the drum.

Although the invention has been shown and described with respect to the preferred embodiments, it will be understood by those skilled in the art that various changes and modifications may be made without departing from the scope of the invention as defined in the following claims.

What is claimed is:

1. An apparatus for fixedly attaching a transformer with an opening to a terminal surface of a protruding annular portion of a rotary drum, wherein the rotary drum is provided on a jig and its terminal surface is applied with a bonding agent, the apparatus comprising a sliding member, means for driving the sliding member, a rod for guiding the movement of the sliding member and means for pressing the transformer toward the drum, wherein said pressing means includes:

a holder, which is an integral part of the sliding member;

a rod-shaped supporting member, whose one end is attached to the bottom of the holder, and the other end is removably provided with a portion having a larger diameter than that of the supporting member;

a cap movably fitting around the circumferential surface of the supporting member at the end proximal to the holder in such a way that its vertical position is allowed to be adjusted;

a ring provided with a groove for accommodating a part of the larger diameter portion of the supporting member, wherein the ring is used for applying a uniform pressure to the rotary transformer and fits around the circumferential surface of the supporting member at the end distal to the holder; and a resilient member for providing an elastic force to the ring located between the cap and the ring in such a way that the ring is allowed to apply a uniform pressure on the upper surface of the rotary transformer during the pressing operation thereof, thereby fixedly attaching the rotary transformer to the drum.

2. The apparatus of claim 1, wherein the pressing means further includes a fixing member for fixing the supporting member to the holder.

3. The apparatus of claims 1 or 2, wherein the holder is, at its bottom, provided with a recess for accommodating the proximal end of the supporting member.

4. The apparatus of claim 1, wherein the larger diameter portion of the supporting member is divided into a first portion accommodated to the groove for preventing the ring from deviating from the supporting member, a second portion to be fitted closely and comfortably into the opening of the rotary transformer, and a tapered portion for guiding the second portion into the opening of the rotary transformer.

5. The apparatus of claim 1, wherein the cap is provided with means for adjusting its vertical position.

6. The apparatus of claim 1, wherein the surface of the ring coming into contact with the terminal surface of the rotary transformer is made of a soft material.

7. The apparatus of claim 6, wherein the soft material is a rubber.

8. The apparatus of claim 1, wherein the resilient member is a coil spring.

* * * * *